United States Patent [19]

Brakebill

[11] 4,185,772

[45] Jan. 29, 1980

[54] CONDITION RESPONSE DIFFERENTIAL VACUUM REGULATOR AND METHOD OF MAKING THE SAME

[75] Inventor: Harold G. Brakebill, Concord, Tenn.

[73] Assignee: Robertshaw Controls Company, Richmond, Va.

[21] Appl. No.: 905,060

[22] Filed: May 11, 1978

Related U.S. Application Data

[62] Division of Ser. No. 771,163, Feb. 23, 1977, Pat. No. 4,108,197.

[51] Int. Cl.$^2$ ............................................. G05D 23/02
[52] U.S. Cl. ...................................... 236/86; 137/117; 236/92 R
[58] Field of Search .................. 137/81, 117, DIG. 8; 251/61.3, 63.4; 236/92 R, 86, 87

[56] References Cited

U.S. PATENT DOCUMENTS

| | | | |
|---|---|---|---|
| 3,006,552 | 10/1961 | Ferris | 236/35.3 |
| 3,375,838 | 4/1968 | Cheek et al. | 137/81 |
| 3,448,659 | 6/1969 | Beatenbough et al. | 236/86 X |
| 3,545,465 | 12/1970 | Zadoo | 137/81 X |
| 3,633,601 | 1/1972 | Vez | 137/81 |
| 3,700,165 | 10/1972 | Beehler et al. | 236/87 X |
| 3,982,553 | 9/1976 | Johnston et al. | 137/81 |

Primary Examiner—William E. Wayner
Assistant Examiner—William E. Tapolcai, Jr.
Attorney, Agent, or Firm—Candor, Candor & Tassone

[57] ABSTRACT

A differential vacuum regulator having an input chamber and an output chamber and a control arrangement for providing an output signal in the output chamber that has a constant differential value from the value of an input signal in the input chamber, the regulator having a condition responsive unit that is independent from the value of the input signal and is adapted for varying the differential value in relation to the condition being sensed by the condition responsive unit.

4 Claims, 6 Drawing Figures

CONDITION RESPONSE DIFFERENTIAL VACUUM REGULATOR AND METHOD OF MAKING THE SAME

This application is a divisional patent application of its copending parent patent application, Ser. No. 771,163, filed Feb. 23, 1977, now U.S. Pat. No. 4,108,197.

This invention relates to an improved differential vacuum regulator and method of making the same.

It is well known that a differential vacuum regulator can be provided which will produce an output signal that has a constant differential value from the value of an input signal being directed thereto.

However, it was found that it was desired to provide such a vacuum which would produce an output signal which is substantially equal in value to the value of the manifold vacuum of an automobile when the same is at approximately 5,000 feet altitude and to produce an output signal that has a value that is less than the manifold vacuum when the automobile is at elevations below 5,000 feet whereby the difference between the value of the manifold vacuum and the value of the output signal increases substantially uniformly with decreasing altitude. Such output signal from such a regulator can be utilized for operating desired engine controls of the automobile.

Accordingly, it is a feature of this invention to provide a differential vacuum regulator of the prior known type and having condition responsive means of this invention for varying the differential value of the regulator in relation to the condition being sensed by the condition responsive means.

In particular, one embodiment of this invention provides a differential vacuum regulator having an input chamber and an output chamber and control means for providing an output signal in the output chamber that has a constant differential value from the value of the input signal in the input chamber, the regulator having condition responsive means that is independent of the value of the input signal and that will vary the differential value in relation to the condition being sensed by the condition responsive means.

Accordingly, it is an object of this invention to provide an improved differential vacuum regulator having one or more of the novel features of this invention as set forth above or hereinafter shown or described.

Another object of this invention is to provide a method of making an improved differential vacuum regulator, the method of this invention having one or more of the novel features of this invention as set forth above or hereinafter shown or described.

Other objects, uses, and advantages of this invention are apparent from a reading of this description which proceeds with reference to the accompanying drawings forming a part thereof and wherein.

Figure 1:
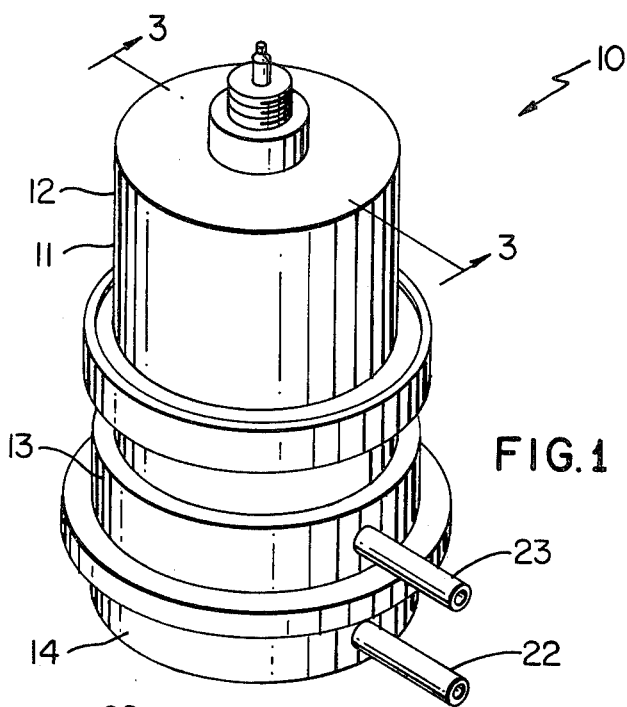
FIG. 1 is a top perspective view of the improved vacuum regulator of this invention.

While the various features of this invention are hereinafter described and illustrated as being particularly adapted to provide a vacuum regulator for an automobile control system, it is to be understood that the various features of this invention can be utilized singly or in any combination thereof to provide a vacuum regulator for other systems as desired.

Therefore, this invention is not to be limited to only the embodiment illustrated in the drawings, because the drawings are merely utilized to illustrate one of the wide variety of uses of this invention.

Further, while reference is made to a "vacuum" regulator, it is to be understood that this application and its claims are intended to cover "pressure" regulators, etc.

Figure 3:
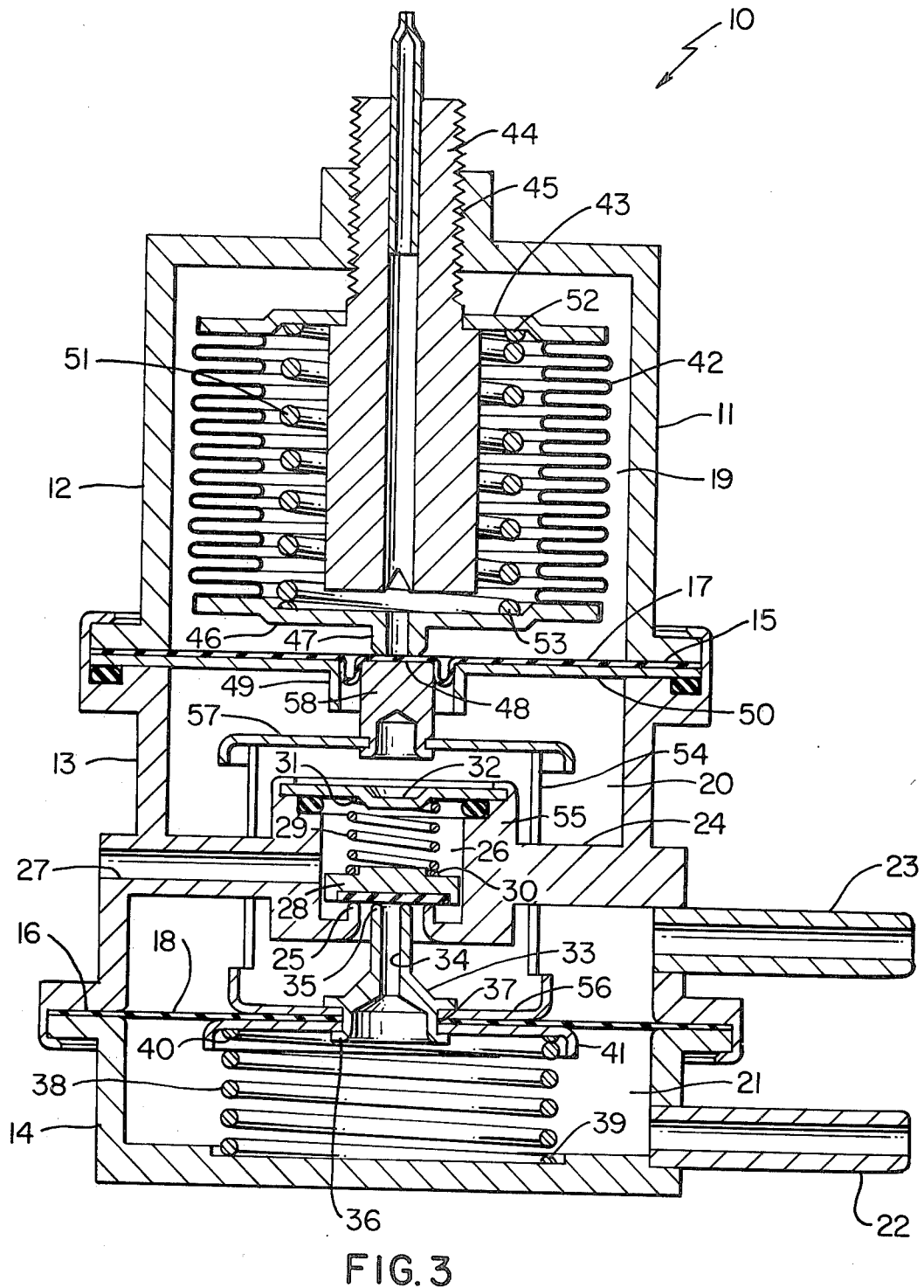
FIG. 3 is an enlarged cross-sectional view taken on line 3—3 of FIG. 1.

Referring now to FIGS. 1 and 3, the improved vacuum regulator of this invention is generally indicated by the reference numeral 10 and comprises a housing means 11 formed from a plurality of housing parts 12, 13 and 14 suitably secured together as illustrated and trapping the outer peripheral portions 15 and 16 of a pair of flexible diaphragms 17 and 18 therebetween whereby the diaphragms 17 and 18 cooperate with the housing means 11 to define therein three separated chambers 19, 20 and 21.

The chamber 21 is adapted to be interconnected by a nipple means 22 to the vacuum manifold of an automobile whereby the chamber 21 becomes an input signal chamber for the regulator 10.

Similarly, the chamber 20 is adapted to be interconnected by the nipple means 23 to the desired vacuum controlled device whereby the chamber 20 becomes the output signal chamber for the regulator 10.

The housing part 13 of the housing means 11 has an intermediate web section 24 that is provided with an annular valve seat 25 that leads to a vent chamber 26 formed in the web section 24 and being adapted to be interconnected to the atmosphere by a vent port 27, the web section 24 being suitably open so that fluid in the chamber 20 can circulate between the top and bottom thereof.

The vent chamber 26 has a movable valve member 28 disposed therein and is normally urged in its closed condition against the valve seat 25 by a compression spring 29 also disposed in the chamber 26 and having one end 30 bearing against the valve member 28 and the other end 31 thereof bearing against a closure member 32 that is utilized to seal closed the upper end of the chamber 26 as illustrated from the output chamber 20.

In this manner, the valve member 28 when disposed against the valve seat 25 prevents communication of the output chamber 20 with the vent port 27 and when the valve member 28 is moved away from the valve seat 25, the output chamber 20 is interconnected to the vent port 27 for a purpose hereinafter described.

The diaphragm 18 carries a tubular valve member 33 which has a passage 34 passing completely through the opposed ends 35 and 36 thereof, the end 36 of the tubular valve member 33 being secured in a central opening 37 of the diaphragm 18 so that the passage 34 thereof is always in fluid communication with the input chamber 21. The other end 35 of the tubular valve member 33 is adapted to project into the annular valve seat 25 and bear against the valve member 28 as illustrated in FIG. 3 whereby the valve member 28 is adapted to close the passage 34 from the output chamber 20 when the end 35 of the tubular member 33 is placed against the valve member 28 by the diaphragm 18 as will be apparent hereinafter.

A compression spring 38 is disposed in the input chamber 21 and has one end 39 bearing against the housing part 14 and the other end 40 effectively bearing against the diaphragm 18, a spring retainer 41 being disposed between the end 40 of the compression spring 38 and the diaphragm 18 as illustrated.

In this manner, the force of the compression spring 38 is continuously tending to urge the diaphragm 18 upwardly in FIG. 3 and, thus, is tending to continuously urge the end 35 to the tubular valve member 33 into a closed condition against the valve member 28.

A sealed, altitude bellows construction 42 is secured in the chamber 19 of the regulator 10 and has a fixed end 43 secured to the housing part 12 by the threaded relation of an externally threaded part 44 thereof with an internally threaded part 45 of the housing part 12. The other end 46 of the bellows construction 42 is movable upon expansion and contraction of the fluid sealed within the bellows construction 42 and the end 46 has an abuttment 47 that is adapted to bear against an intermediate part 48 of the flexible diaphragm 17, the intermediate part 48 of the diaphragm 17 spanning a tubular part 49 of a diaphragm backup plate 50 so that only the intermediate part 48 of the diaphragm 17 is adapted to move up and down in the tubular part 49 of the backup plate 50.

A compression spring 51 is disposed within the bellows construction 42 and has one end 52 bearing against the fixed wall 43 while the other end 53 bears against the movable wall 46 tending to push the same downwardly in FIG. 3.

A cage-like member 54 surrounds an intermediate portion 55 of the web 24 of the housing part 13 while being movable relative thereto, the lower end 56 of the cage-like part 54 being secured to the diaphragm 18 so as to be movable in unison with the tubular valve member 33 and the upper end 57 of the cage-like part 54 having an abutment 58 that projects into the tubular portion 49 of the diaphragm backup plate 50 to engage against the intermediate part 48 of the diaphragm 17 for a purpose hereinafter described.

Thus, it can be seen that the vacuum regulator 10 of this invention can be formed from relatively simple parts by the method of this invention to operate in a manner now to be described.

Assuming that the vacuum regulator 10 is at sea level, the bellows construction 42 has the fluid therein being opposed by the atmosphere in the chamber 19 so that the force of the bellows construction 42 bearing downwardly on the intermediate portion 48 of the diaphragm 17 and, thus, on the cage 54 tending to oppose the upward force of the compression spring 38 is substantially less than when the chamber 19 is filled with air at a higher altitude than sea level because the force of the air at the higher altitude is less to oppose the pressure of the fluid in the bellows construction 42 as is well known in the altimeter art.

With the chamber 21 of the regulator 10 being interconnected to the manifold vacuum so that a vacuum signal now exists in the input chamber 21, the resulting pressure differential across the diaphragm 18 tends to pull the diaphragm 18 downwardly in FIG. 3 in opposition to the force of the compression spring 38 and should the pressure differential across the diaphragm 18 be sufficiently strong to cause the diaphragm 18 to move downwardly in opposition to the force of the compression spring 38, the end 35 of the tubular valve member 33 is pulled away from the valve member 28 which cannot follow such downward movement of the tubular valve member 33 because the valve member 28 is held in the position of FIG. 3 by the valve seat 25. Thus, the opening of the end 35 of the tubular member 33 interconnects the input chamber 21 with the output chamber 20 to being to evacuate the same and thereby create a vacuum output signal in the chamber 20.

As the chamber 20 is being evacuated in the above manner, the pressure differential across the diaphragm 18 progressively decreases so that at a certain value of the vacuum signal now being created in the output chamber 20, the force of the compression spring 38 is adapted to overcome that certain pressure differential acting across the diaphragm 18 and move the diaphragm 18 upwardly to again close the end 35 of the tubular valve member 33 across the valve member 28 whereby it can be seen that the force of the compression spring 38 provides a differential value between the value of the vacuum in the input chamber 21 and the value of the vacuum in the output chamber 20.

Should the value of the output signal in the output chamber 20 be too great, then the pressure differential acting across the diaphragm 18 is less than is required to hold the diaphragm 18 in the position of FIG. 3 so that the force of the compression spring 38 moves the diaphragm 18 further upwardly in FIG. 3 whereby the end 35 of the tubular member 33 lifts the valve member 28 off of the valve seat 25 in opposition to the force of the compression spring 29 to interconnect the output chamber 20 with the vent port 27 and thereby reduce the vacuum value in the chamber 20 until the same returns to the vacuum value which will produce the differential value between the vacuum signals in the chambers 21 and 20 for which the regulator 20 is designed for sea level operation thereof.

Figure 2:
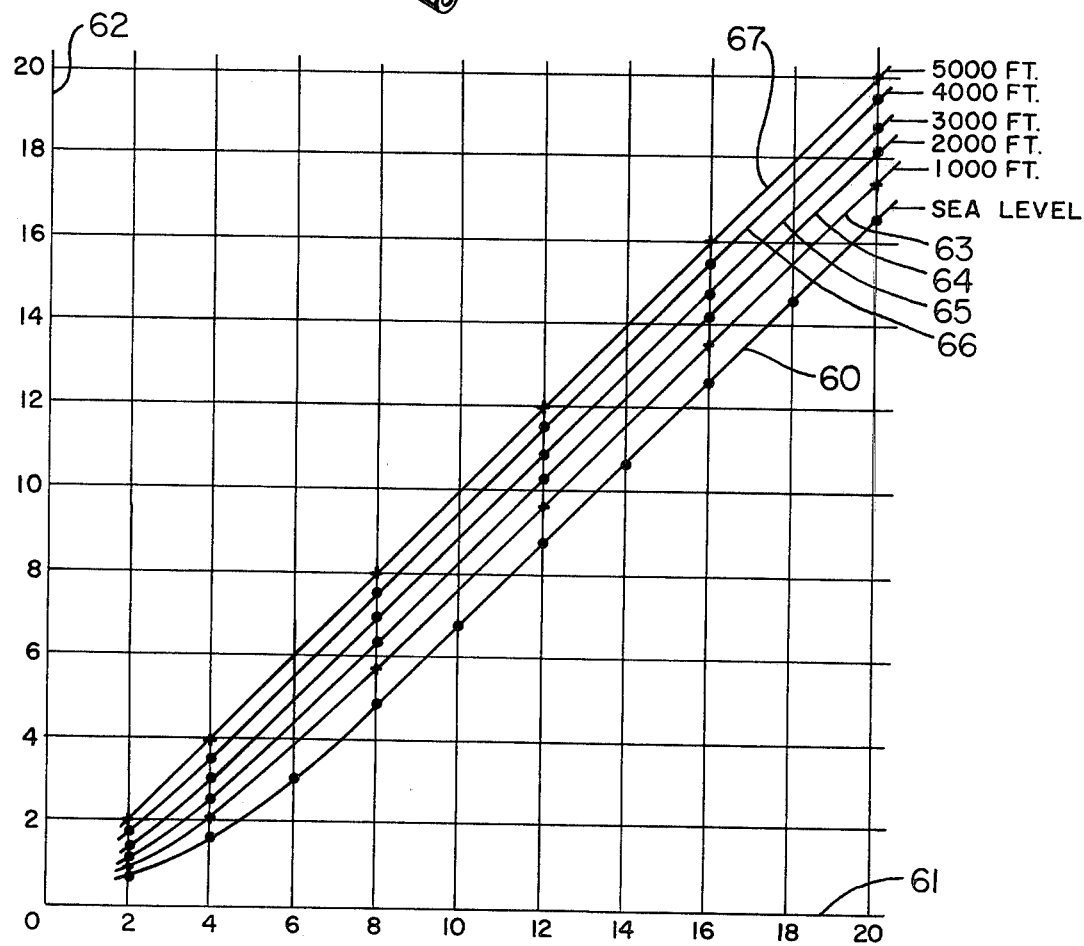
FIG. 2 is a graph illustrating the performance of the regulator of this invention.

For example, the vacuum regulator 10 of this invention is designed to produce a substantially constant differential value between the value of the input signal in the input chamber 21 and the value of the output signal in the output chamber 20 as represented by the line 60 on the graph of FIG. 2 wherein the axis 61 thereof represents the manifold vacuum or input vacuum signal in inches of Hg and the Y axis 62 represents the value of the output vacuum in the chamber 20 in inches of Hg.

Accordingly, at sea level, the vacuum regulator 10 operates in the above manner to provide a substantially constant differential value of approximately three inches of Hg between the value of the manifold vacuum and the value of output vacuum. For example, when the manifold vacuum at six inches Hg, the output vacuum will be approximately three inches Hg, and when the value of the manifold input vacuum is approximately 20 inches Hg, the value of the output vacuum will be approximately 17 inches Hg at sea level.

However, as the vacuum regulator 10 is carried to higher altitudes, such as caused by the automobile carrying the same climbing a mountain, the force of the bellows construction 42 tending to oppose the upward force of the compression spring 38 increases and, thus, effectively decreases the effective force of the spring 38 tending to move the diaphragm 18 upwardly so that the differential value for the regulator 10 progressively decreases as the altitude of the vacuum regulator increases.

As illustrated in the graph of FIG. 2, the line 63 represents the change in the differential value of the regulator 10 at 1,000 feet, the line 64 represents the change in the differential value at 2,000 feet, the line 65 at 3,000 feet, the line 66 at 4,000 feet and the line 67 at 5,000 feet.

At an altitude of 5,000 feet for the regulator 10, it can be seen that the vacuum regulator 10 has reduced the differential value to substantially zero so that the value of the output signal in the output chamber 20 is equal to the value of the input signal in the input chamber 21 whereby the regulator 10 produces the desired result previously described for the automobile control system where it was desired that the output vacuum would be equal to the manifold vacuum at 5,000 feet and that the value of the input vacuum would progressively decrease as the altitude of the regulator 10 progressively decreased from 5,000 feet.

Accordingly, it can be seen that the vacuum regulator 10 of this invention is a differential vacuum regulator providing a constant differential value between the input signal and the output signal thereof as long as the same remains at a particular altitude but as the altitude changes, the regulator 10 varies the differential value in relation to the altitude of the regulator 10 for the reasons previously set forth because the effective force of the spring 38 is changed by the condition responsive means 42.

Figure 4:
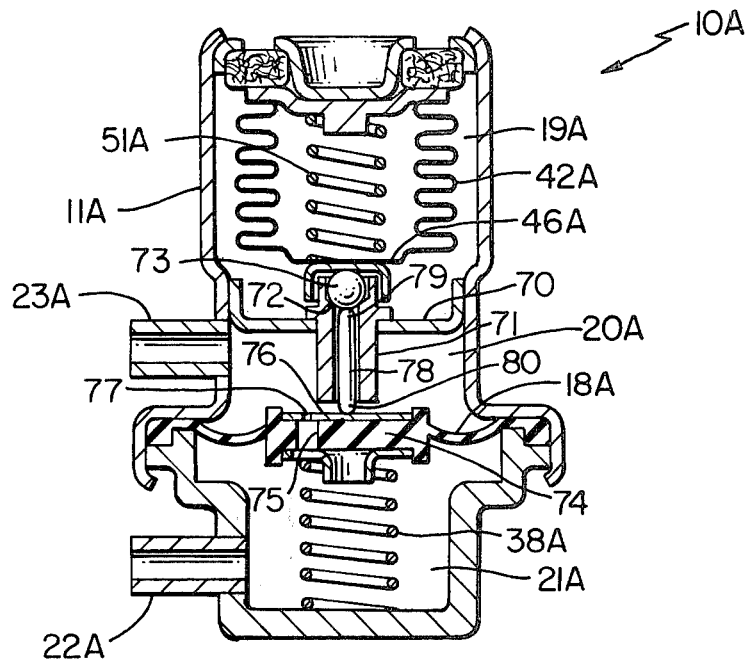
FIG. 4 is a view similar to FIG. 3 and illustrates another vacuum regulator of this invention.

While one form of such a vacuum regulator has been illustrated and described, another such vacuum regulator of this invention is generally indicated by the reference numeral 10A in FIG. 4 and parts thereof similar to the regulator 10 previously described are generally indicated by like reference numerals followed by the reference letter "A".

As illustrated in FIG. 4, the housing means 11A is divided into three chambers 19A, 20A, and 21A with the chamber 20A comprising the output signal chamber adapted to be interconnected to the desired control device by the nipple means 23A while the chamber 21A is adapted to be interconnected to a vacuum source by the nipple means 22A.

The chamber 19A of the regulator 10A becomes the vent chamber for the regulator 10A and is defined in part by a wall 70 carrying a tubular member 71 passing therethrough and having a valve seat 72 at the upper end thereof adapted to be closed by a ball valve member 73 normally urged to the closed position by the movable wall 46A of the bellows construction 42A disposed within the chamber 19A.

The flexible diaphragm 18A that separates the chambers 20A and 21A from each other has a thickened intermediate part 74 provided with an opening 75 passing therethrough in offset relation to the center thereof and being closed at the upper end by an orifice plate 76 having an orifice 77 disposed in fluid communication with the opening 75 to thereby provide a continuous restricted bleed between the chambers 20A and 21A at a controlled rate.

A rod-like member 78 is disposed in the tubular member 71 and has one end 79 adapted to abut the ball valve member 73 and the other end 80 thereof adapted to abut against the intermediate part 74 of the diaphragm 18A at the orifice plate 76 thereof.

The regulator 10A has the compression spring 38A tending to urge the diaphragm 18A upwardly and the bellows construction 42A has the compression spring 51A tending to oppose the upward movement of the diaphragm 18A from the condition of FIG. 4 as will be apparent hereinafter.

Therefore, it can be seen that the regulator 10A can be formed from relatively simple parts according to the method of this invention to operate in a manner now to be described.

With the regulator 10A at sea level, the bellows construction 42A is tending to hold the ball valve member 73 against the valve seat 72 to close the vent means of the regulator 10A with a force that is less than the force when the regulator 10A is at higher altitude because the force of the air in the chamber 19A tending to oppose the force of the fluid that is sealed in the chamber 42A is greater at sea level than at higher altitudes as previously described.

Thus, at sea level, as the value of the vacuum signal being produced in the chamber 20A by the vacuum signal in the chamber 21A bleeding air out of the chamber 20A through the orifice 77 causes the pressure differential acting across the diaphragm 18A to decrease to the point where the force of the compression spring 38A is sufficient to move upwardy in FIG. 4 and push the valve member 73 off of the valve seat 72 in opposition to the force of the bellows construction 42A, air is permitted to return to the chamber 20A from the vent chamber 19A through the open valve seat 72 and tubular member 71 until the pressure differential acting across the diaphragm 18A increases sufficiently to overcome the force of the compression spring 38A and move the diaphragm 18A back to the condition of FIG. 4. where the ball valve member 73 can again be seated against the valve seat 72.

Thus, at sea level, a certain constant differential value is provided by the regulator 10A between the value of the input signal in the chamber 21A and the value of the output signal in the output chamber 20A, the constant differential value decreasing as the altitude of the regulator 10A increases because the force of the bellows construction 42A tending to hold the valve member 73 against the valve seat 72 increases with increasing altitude whereby at a certain altitude, such as the aforementioned 5,000 feet, the differential value falls to substantially zero and the value of the signal in the output chamber 20A is substantially the same as the value of the input signal in the input chamber 21A.

While the vacuum regulator 10 and 10A previously described are both altitude responsive, it is to be understood that the vacuum regulator of this invention can be responsive to other conditions as desired.

Figure 5:
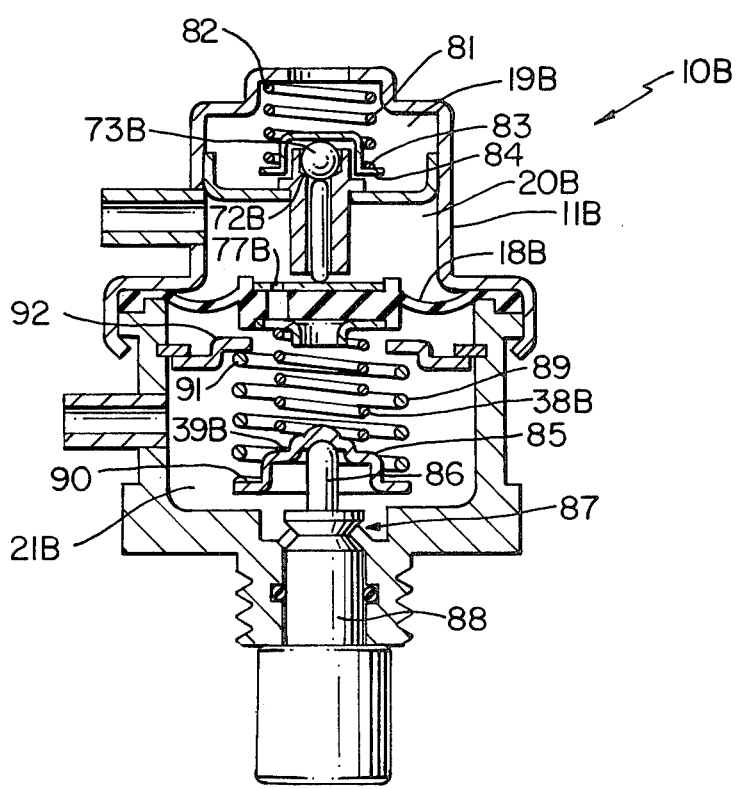
FIG. 5 is a view similar to FIG. 4 and illustrates another vacuum regulator of this invention.

For example, another vacuum regulator of this invention is generally indicated by the reference numeral 10B in FIG. 5 and is adapted to be responsive to the temperature of the regulator 10B and not the altitude thereof, the parts of the regulator 10B that are similar to the regulators 10 and 10A previously described are indicated by like reference numerals followed by the reference letter "B".

As illustrated in FIG. 5, the vent chamber 19B of the housing means 11B does not contain the bellows construction 42A previously described, but does contain a compression spring 81 that has one end 82 bearing against the housing means 11B and the other end 83 thereof bearing against a spring retainer 84 that engages against the ball valve member 73B to tend to hold the same in its closed condition against the valve seat 72B.

The compression spring 38B for the diaphragm 18B does not have its lower end 39B bearing against the housing means 11B as provided by the end 39A of the spring 38A of FIG. 4, because the end 39B of the spring 38B bears against a spring retainer 85 that engages against a piston 86 of a temperature responsive piston and cylinder device 87 that has its cylinder 88 secured to the housing means 11B as illustrated.

The piston and cylinder device 87 is of conventional form and as well known, causes the piston 86 to extend out of the cylinder 88 as the temperature being sensed by the device 87 increases and has the piston 86 thereof retract into the cylinder 88 as the temperature being sensed by the device 87 decreases because the cylinder 88 contains a wax charge that expands upon increase in temperature thereof and contracts upon decrease in temperature thereof.

If desired, a second compression spring 89 can be concentrically disposed about the compression spring 38B and have one end 90 also bearing against the spring retainer 85 while the other end 91 of the spring 89 bears against an annular spring retainer 92 carried by the housing means 11B as illustrated whereby the outer spring 89 can perform the function of returning the piston 86 of the device 87 into the cylinder 88 upon a decrease of temperature as the force of the compression spring 38B may not be sufficient for this purpose.

In any event, it can be seen that the pressure regulator 10B of this invention can be formed of relatively few parts in a simple manner according to the method of this invention to operate in a manner now to be described.

Assuming that the regulator 10B is at a certain temperature so that the piston 86 is in the condition illustrated in FIG. 5 relative to the cylinder 88, the force of the compression spring 38B tending to urge the diaphragm 18B upwardly remains constant at this temperature so that the bleed through the orifice 77B will cause the output signal in the output chamber 20B to be at a certain differential value below the value of the signal in the input chamber 21B. Thus, the force of the compression spring 38B provides such constant differential and the vent valve member 73B opens and closes the valve seat 72B to tend to maintain such constant differential value in the manner previously described for the regulator 10A of FIG. 4.

Should the temperature being sensed by the device 87 decrease, the piston 86 of the unit 87 moves further into the cylinder 88 under the force of the spring 89 and thereby moves the end 39B of the compression spring 38B downwardly so that the effective force of the compression spring 38B tending to urge the diaphragm 18B upwardly decreases producing a corresponding decrease in the differential value between the values of the input signal and output signal. Conversely, should the temperature of the unit 87 increase, the piston 86 of the device 87 moves upwardly and carries the end 39B of the compression spring 38B therewith so that the effective force of the compression spring 38B increases whereby the differential value between the input signal and the output signal correspondingly increases while still remaining constant at any one temperature.

Therefore, it can be seen that the regulator 10B of this invention is temperature responsive for varying the constant differential value of the regulator construction 10B.

If desired, the vacuum regulators of this invention could be made responsive to more than one condition.

Figure 6:
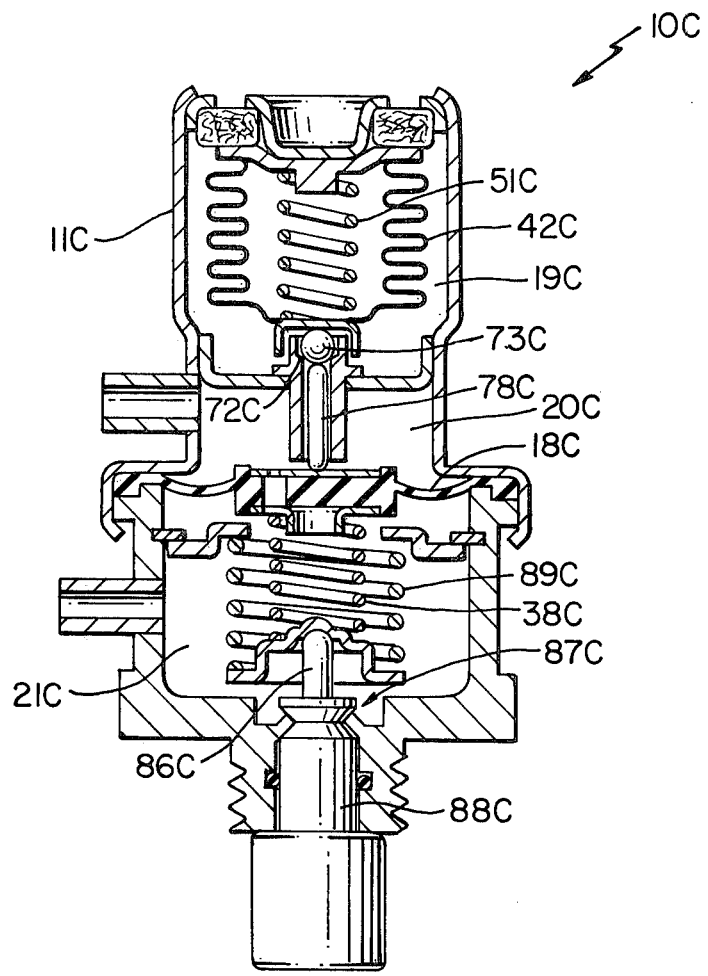
FIG. 6 is a view similar to FIG. 4 and illustrates another vacuum regulator of this invention.

For example, another vacuum regulator of this invention is generally indicated by the reference numeral 10C in FIG. 6 and parts thereof similar to the regulators 10, 10A, and 10B previously described are indicated by like reference numerals followed by the reference letter "C".

As illustrated in FIG. 6, the vacuum regulator 10C includes an altitude responsive bellows construction 42C and the temperature responsive unit 87C of the regulators 10A and 10B previously described so that if the altitude of the regulator 10C increases, the bellows construction 42C increases its force tending to hold the ball valve member 73C against the valve seat 72C to thereby decrease the differential value between the input signal and the output signal whereas the temperature responsive unit 87C tends to increase that differential value upon an increase in temperature and decrease the differential value upon a decrease in temperature for the same reasons that the unit 87 of FIG. 5 varied the differential value of the regulator 10B.

Therefore, it can be seen that in each of the vacuum regulators of this invention, the same will provide a substantially constant differential value between the value of the input signal and the output signal thereof as long as a certain condition of the regulator remains substantially constant and when that certain condition of the regulator varies, the differential value is varied according to the change in that certain condition.

Therefore, it can be seen that this invention provides an improved vacuum regulator as well as a method for making such a vacuum regulator or the like.

While the forms and methods of this invention, now preferred, have been illustrated and described as required by the Patent Statute, it is to be understood that other forms and method steps can be utilized and still fall within the scope of the appended claims.

What is claimed is:

1. In a differential vacuum regulator having an input chamber and an output chamber and control means for providing an output signal in said output chamber that has a constant differential value from the value of an input signal in said input chamber, said regulator having condition responsive means independent from the value of said input signal for varying said differential value in relation to the condition being sensed by said condition responsive means, said regulator having a spring that has an effective force that provides said constant differential value, said condition responsive means being operatively associated with said spring to vary said effective force thereof in response to variations in the condition being sensed thereby to thereby vary said differential value, said condition responsive means having a movable member that is moved relative to said regulator upon changes in said sensed conditions, said movable member being operatively interconnected to said spring, said regulator having vent means interconnected to said outlet chamber, said spring force tending to open said vent means, the improvement wherein said regulator has a movable flexible diaphragm means separating said chamber and being disposed intermediate and in operative engagement with said spring and said vent means, said diaphragm means having restriction means interconnecting said chambers together at a controlled rate, said condition responsive means being responsive to temperature.

2. A differential vacuum regulator as set forth in claim 1 wherein said regulator also has an altitude condition responsive means for effectively varying the force of said spring in relation to variations in altitude.

3. In a method of making a differential vacuum regulator having an input chamber and an output chamber and control means for providing an output signal in said output chamber that has a constant differential value from the value of an input signal in said input chamber, said regulator having condition responsive means independent from the value of said input signal for varying said differential value in relation to the condition being sensed by said condition responsive means, said regulator having a spring that has an effective force that provides said constant differential value, said condition responsive means being operatively associated with said spring to vary said effective force thereof in response to variations in the condition being sensed thereby to thereby vary said differential value, said condition responsive means having a movable member that is moved relative to said regulator upon changes in said sensed conditions, said movable member being operatively interconnected to said spring, said regulator having vent means interconnected to said outlet chamber, said spring force tending to open said vent means, the improvement comprising the steps of forming said regulator with a movable flexible diaphragm means separating said chambers and being disposed intermediate and in operative engagement with said spring and said vent means, forming said diaphragm means with restriction means that interconnects said chambers together at a controlled rate, and forming said condition responsive means to be responsive to temperature.

4. A method of making a differential vacuum regulator as set forth in claim 3 and including the step of forming said regulator with an altitude condition responsive means for effectively varying the force of said spring in relation to variations in altitude.

* * * * *